March 30, 1926. 1,578,946
C. D. YOUNG
FISHPLATE
Filed May 2, 1921 5 Sheets-Sheet 3
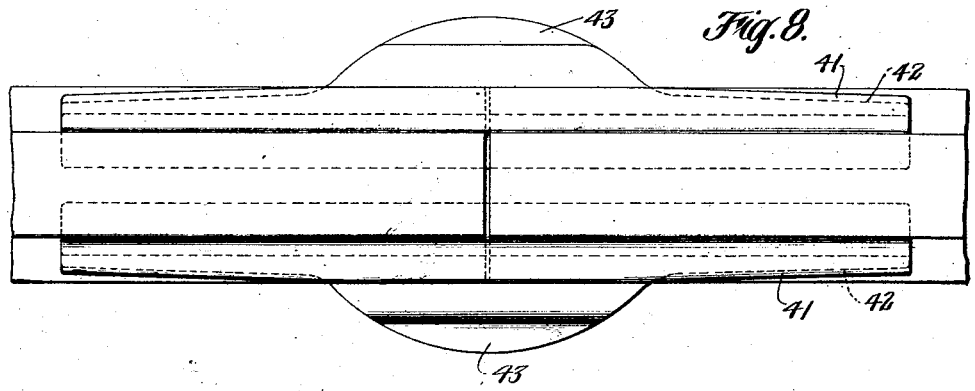
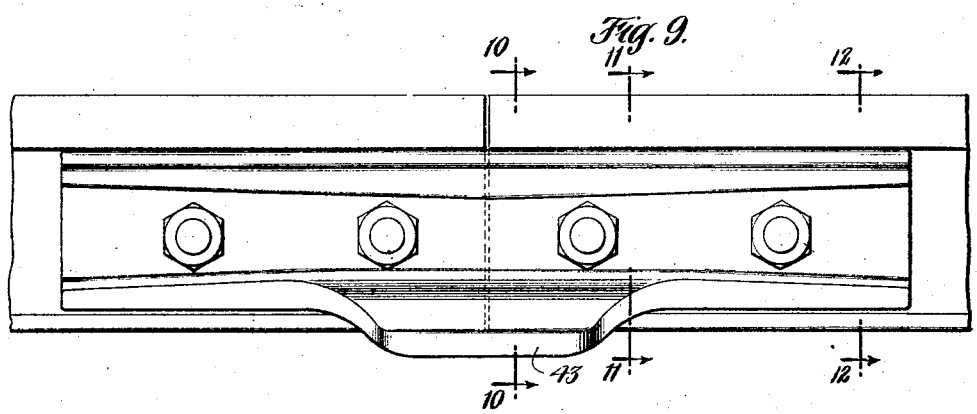
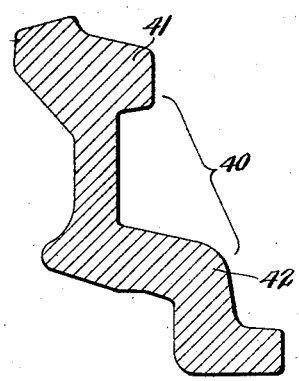 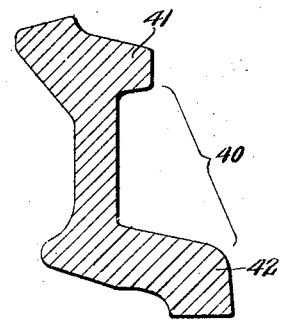 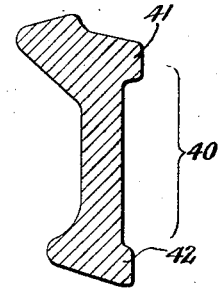
Inventor
Charles D. Young
By Attorneys March 30, 1926.

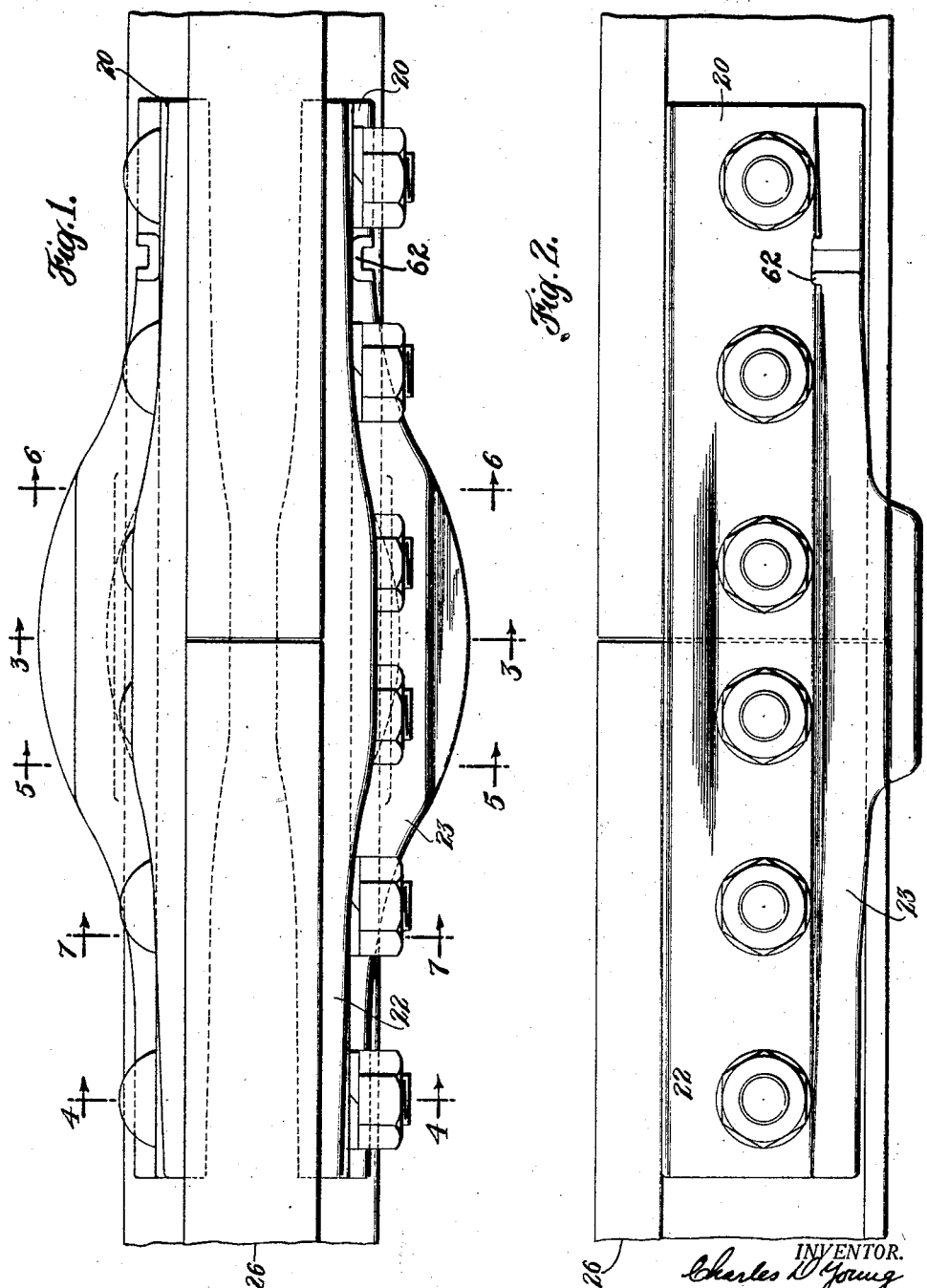

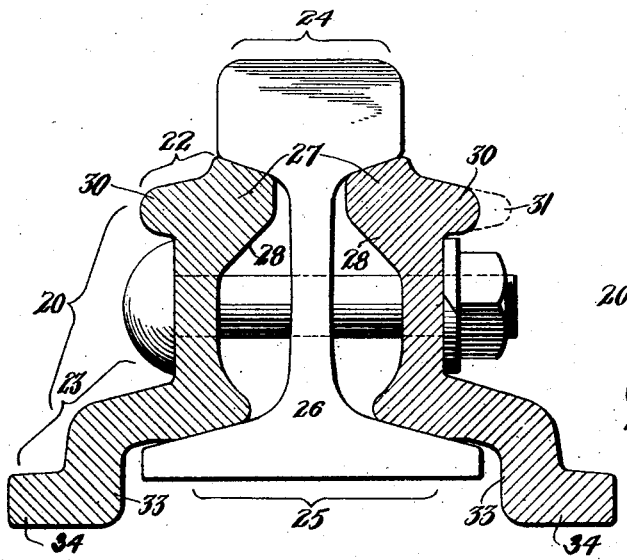
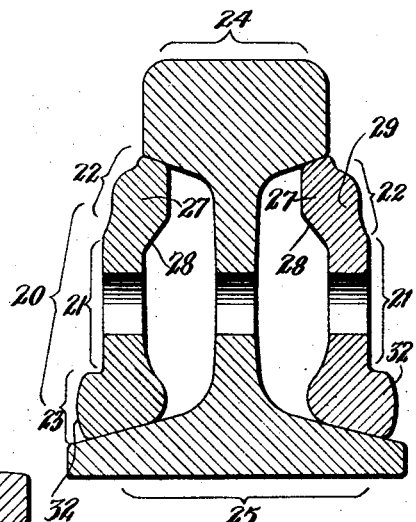
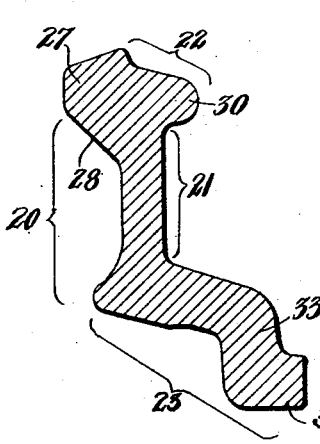
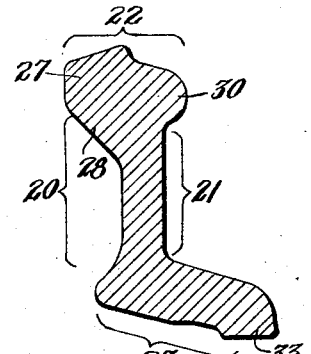
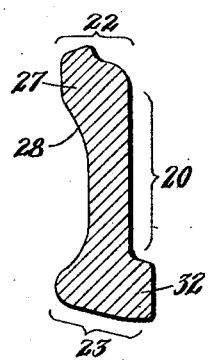
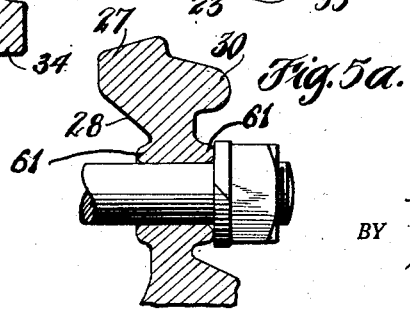

C. D. YOUNG

FISHPLATE

Filed May 2, 1921

1,578,946

5 Sheets-Sheet 4

Inventor
Charles D. Young

By Attorneys

March 30, 1926.
C. D. YOUNG
FISHPLATE
Filed May 2, 1921
1,578,946
5 Sheets-Sheet 5
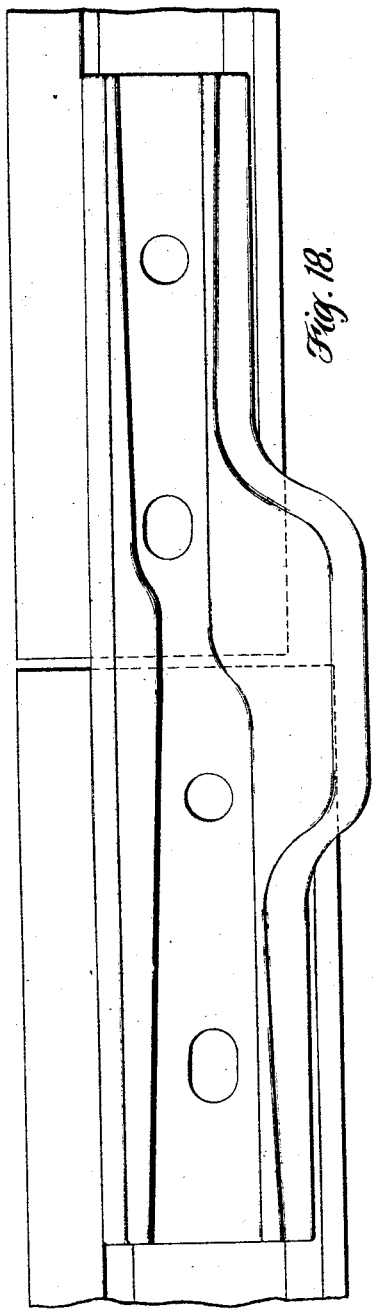
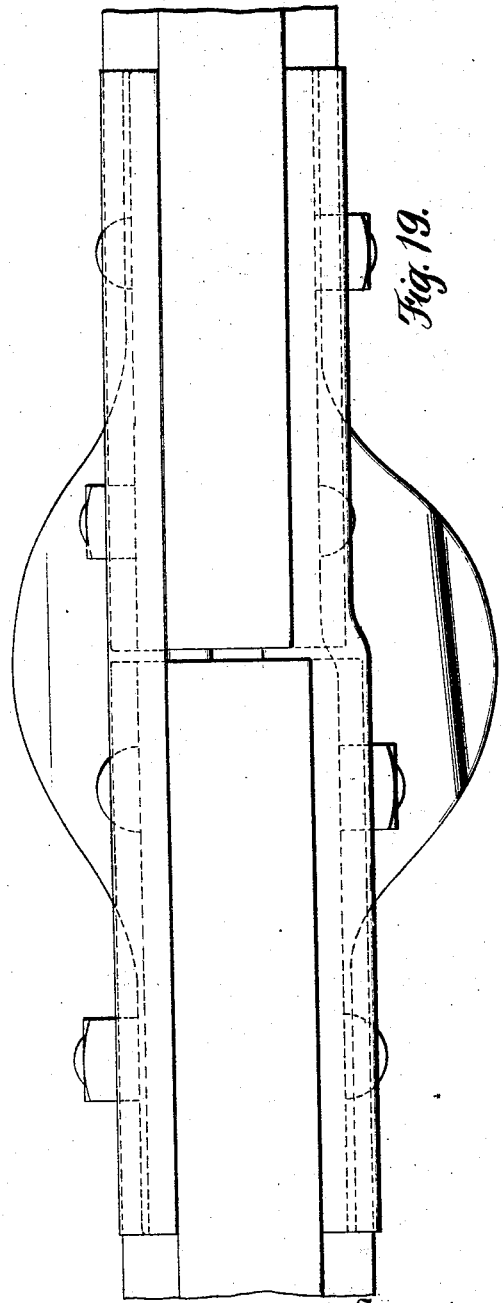

Patented Mar. 30, 1926.

1,578,946

UNITED STATES PATENT OFFICE.

CHARLES D. YOUNG, OF PHILADELPHIA, PENNSYLVANIA.

FISHPLATE.

Application filed May 2, 1921. Serial No. 466,081.

*To all whom it may concern:*

Be it known that I, CHARLES D. YOUNG, a citizen of the United States, residing at Philadelphia, in the county of Philadelphia and State of Pennsylvania, have invented certain new and useful Improvements in Fishplates, of which the following is a specification.

My invention relates to fish-plates or joint bars for railway construction, and comprises a novel and highly advantageous form or type of fish-plate.

In rail joints, the concentrated load produces deflection and in standard forms of fish or joint bars the effects of deflection are localized at the joint, i. e. at the center of the bars at which point practically all failures of the bar occur. Heretofore it has been attempted to meet this difficulty by increasing the size of the bars, but this only makes more marked the vibration, anvil effects and heavy hammer blows on the tops of the rails, resulting in battering of the rails, and other detrimental sequelae.

One of the primary objects of my invention is to overcome the aforesaid difficulties to which end I provide an improved bar so formed or shaped as to distribute, under deflection, the effects of the load producing such deflection throughout the bar, i. e. to distribute the fibre stresses longitudinally of the bar approximately uniformly.

Another object is to provide a joint bar in which maximum strength is obtained with less metal than heretofore possible.

Figure 13:
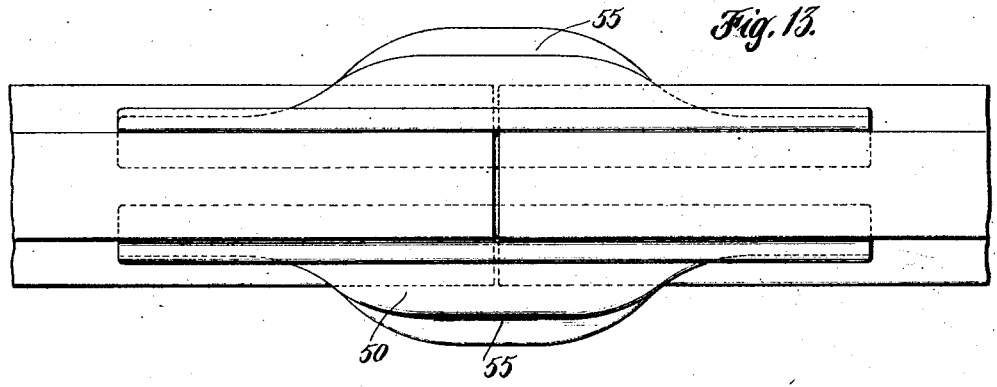
Figure 14:
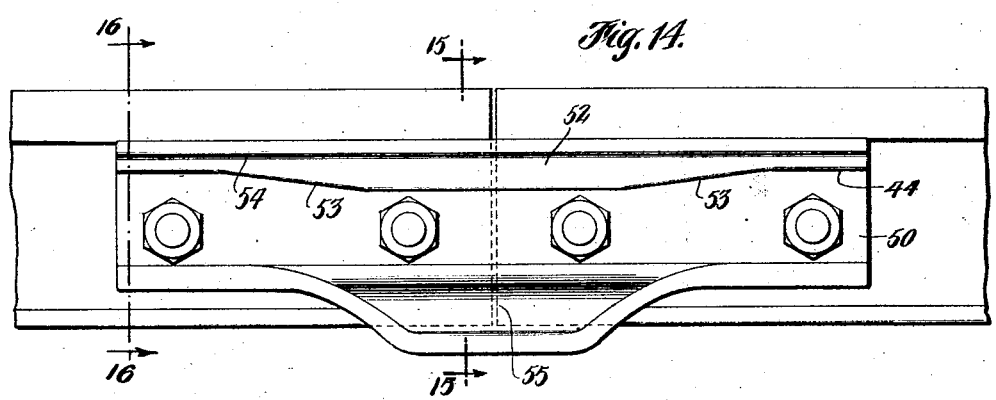
Figure 15:
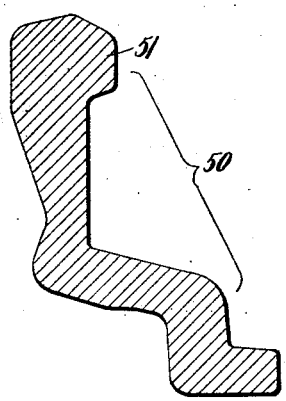
Figure 16:
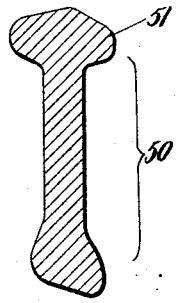
Figure 17:
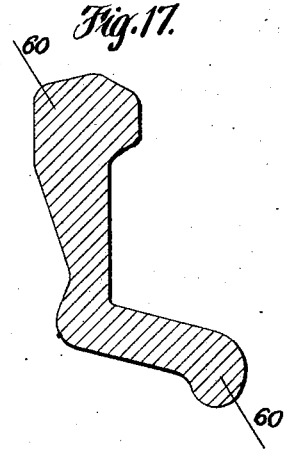

In the accompanying drawings:

Fig. 1 is a plan view of a rail joint comprising one design of fish-plate embodying my invention; Fig. 2 is a corresponding elevation; Fig. 3 shows a cross section through the middle of the joint, as indicated by the line 3—3 in Fig. 1, on a larger scale than that of Fig. 1; Fig. 4 shows a cross section at the bolt hole near one end of the joint, taken as indicated by the line 4—4 in Fig. 1,—the bolt being omitted; Figs. 5, 6 and 7 show cross sections through one of the fish-plates, taken as indicated by the lines 5—5, 6—6, 7—7 in Fig. 1; Fig. 5ª is a fragmentary sectional view illustrating a detail of the invention; Fig. 8 is a plan view of a rail joint comprising a modified design of fish-plate; Fig. 9 is a corresponding elevation; Figs. 10, 11 and 12 show cross sections through one of the fish-plates taken as indicated by the line 10—10, 11—11, and 12—12 in Fig. 9; Figs. 13 and 14 are a plan view and an elevation, respectively, of a joint comprising another modified design of fish-plate; Figs. 15 and 16 show cross sections of the fish-plate, taken as indicated by the lines 15—15 and 16—16 in Fig. 14; and Fig. 17 is a cross sectional view illustrating a stage in the manufacture of the fish-plate shown in Figs. 13, 14, 15 and 16; and Figs. 18 and 19 illustrate the application of my invention to a "compromise" joint bar.

Referring to Figs. 1 to 7, generally, it will be seen that the fish-plate or joint bar 20 there shown comprises throughout its length a web 21 of substantially uniform thickness and a head 22 and a base 23 more or less enlarged. The head 22 and the base 23 are beveled at top and bottom to the proper angle to adapt them for engagement between the head 24 and the base or foot 25 of the rail 26. It will also be observed that the mass and the width of the joint-bar head 22 and base 23 are greatest at the middle of the bar 20, opposite the adjacent ends of the joined rail lengths—and that at either side of the middle they diminish gradually toward and substantially to its very ends.

As respects the head 22, the augmentation toward and at the middle of the bar 20 takes place on both the inner and the outer faces of the bar. On the inner face, the enlargement takes the form of a progressive exaggeration of the trapezoidal-like swell 27 that extends to the ends,—an increase of "base length" where this trapezoidal swell merges with the web 21, an increased steepness of inclination of the lower "end" 28 of the trapezoid, and also an increase in the "height" or width of the trapezoid laterally with reference to the rail. On the outer face, the enlargement first results in filling out (see Fig. 7) a "reduction" clearly apparent at 29 in Fig. 4, and then takes the form of a pronounced headed projection or flange 30 (see Figs. 3, 5 and 6). This flange 30 may, indeed, exceed in width the maximum of the swell 27, as indicated by dotted lines at 31 in Fig. 3.

As respects the base 23, the augmentation toward and at the middle of the bar 20 is much more pronounced on the outer face of the bar, where the rudimentary flange 32 at the ends of the bar (Figs. 4 and 7) first increases in width till it extends beyond the edge of the rail base 25, then turns downward as a hanging flange 33 (see Figs. 6, 5 and 3), and then extends laterally outward again as shown at 34. It will be seen, therefore, that the bar is of L beam or anglebar configuration in the middle, where its base has the wide flange 33, and of I beam configuration and structural character at the ends, where the rudimentary base flange 32 becomes comparable in mass and width to the corresponding swell on the rail side of the bar.

It will further be observed that although the variation in mass and width of the bar head 22 and base 23 is just the same in the two halves of the bar 20, it is not uniform throughout either half. In each half, on the contrary, the increase is very gradual (and substantially uniform) from the extreme ends to the section line 7—7 (Fig. 1) about at the second bolt hole; it then becomes progressively greater and greater till the section line 5—5 (Fig. 1) is reached; and thereafter it progressively becomes less and less. About at the third bolt hole from the end of the bar, the head 22 becomes uniform, but the base 23 still increases in mass and width (as above described) till the very middle of the bar is reached. In a word, the width and mass of the bar and of its head and base diminish gradually (though not uniformly) from the middle to either side, and vertical dimensions of the head (at both the inner and the outer faces of the bar) also diminish in that manner.

The result of the variation of the bar section from end to end as illustrated and described is (with a correct design such as shown) to distribute the effects of the load substantially uniformly throughout the length of the bar, i. e. localization of fibre stresses is avoided and such stress, under deflection, is substantially uniform throughout the bar. Indeed, the variation of the bar section as illustrated and described secures substantially uniform distribution and intensity of the stresses in it both vertically and horizontally. For (to summarize the whole matter briefly) the distribution of the metal in the bar corresponds to the forces brought to bear on various portions of it in service.

This distribution of the metal to the best advantage throughout the length of the bar allows the bar to be made as light as possible, thus reducing the mass and momentum of the whole joint when it rebounds after being depressed by elastic flexure of the rail by a passing wheel, and minimizing the vibration and the hammering effects.

Referring now to Figs. 8 to 12, it will be seen that the modification shown consists mainly in a simplification as regards the variation in cross section, i. e., the fish plate 40 has a head 41 of uniform width throughout and a base 42 of uniform width except in the middle third 43 of its length (roughly speaking), where it is amplified outward (rather less gradually than in Figs. 1–7) into a flange with hanging and outward-extension features about like those already described. The head 41 is of uniform width throughout, as already stated; but its mass and vertical dimensions are a maximum at the middle, on both inner and outer faces, diminishing gradually and nearly uniformly at either side thereof.

Though theoretically less accurately correct than the type shown in Figs. 1 to 7, this form of fish-plate will still be found very satisfactory in service, as well as easier and less expensive to manufacture.

The design shown in Figs. 13 to 16 is modified still further from the first described one, in the same directions as that of Figs. 8 to 12. The fish-plate 50 here has a head 51 that is uniform in width throughout and has vertical dimensions uniform at its middle 52 but diminishing gradually and uniformly at either side thereof (at 53) till its uniform ends 54 are reached. The enlarged portion 55 of the base is substantially uniform in width and mass for a short distance at its middle.

It will be observed that in all these forms the fish-plate presents gradual and not abrupt changes of cross section and strength, and that in all the effective strength, stiffness and maximum fibre-stress are substantially uniform, as above stated, and weight is likewise minimized, because the strength is substantially in proportion to the service stresses throughout.

My fish-plate of any of the forms shown may be manufactured in a variety of ways. In some cases, it may be rolled by means of rolls with grooves of varying depth and width,—eccentrically - grooved rolls. In other cases (especially the last form just described), it may be made by rolling the blank first vertically and then horizontally. Or, again, it may be made by rolling a continuous bar as shown in Fig. 17, cutting from this bar a blank of proper weight, and then finally bringing this to the desired finished shape shown in Figs. 13 to 16 by pressing in dies,—preferably in squeezing dies in a slow-moving, heavy press rather than under a drop hammer. The line 60 indicates the rolling line, the surfaces being so disposed as to permit of rolling on this line. It is also possible to forge or drop hammer bars embodying my invention.

Where the bar is forged or drop hammered, I prefer to form the metal displaced for the bolt holes into fillets, indicated at 61 in Fig. 5ª, preferably of such width as to be included within the projected area of the corresponding bolt-head, as shown. Besides strengthening the bars at the bolt holes where they would otherwise be weakened, these fillets permit of the use of square nuts such as shown in said figure in place of hexagon nuts, which effects a great saving in initial costs, besides which it is preferable for practical reasons to use the square instead of the hexagon nut. The diagonal of the square nut is so long that it would be impractical to use it in the absence of the fillets. It is also possible to form the spike holes or recesses—where such may be needed—with a fillet as shown at 62 in Figs. 1 and 2. It will be understood that as many spike holes or recesses or notches may be provided as are necessary.

In Figs. 18 and 19, the invention is illustrated as applied to a compromise joint bar for joining rails of different size. While not approximating the advantages of the previous types as fully, it will be appreciated that such a joint bar will be very satisfactory.

I claim:

1. A railway joint bar comprising a web with head and base adapted to engage between those of the rail, said bar being of L beam configuration at the middle and of I beam configuration at the ends.

2. A railway joint bar comprising a web with head and base adapted to engage between those of the rail, said bar being of L beam configuration and maximum mass at the middle, and gradually diminishing in mass and changing to I beam configuration at the ends.

3. A railway joint bar comprising a web with head and base adapted to engage between those of the rail, said bar being of L beam configuration at the middle, with a hanging flange on its base, and of I beam configuration at the ends.

4. A railway joint bar comprising a web with head and base adapted to engage between those of the rail, said bar being of L beam configuration at the middle and of I beam configuration at the ends, and its head having at the rail side a swell of maximum mass and vertical dimension at the middle of the bar diminishing gradually in both respects either way therefrom.

5. A railway joint bar comprising a web with head and base adapted to engage between those of the rail, said bar being of L beam configuration and maximum mass at the middle and of I beam configuration at the ends, and diminishing gradually at either side of the middle substantially to either end, all in such wise that the effective strength of the bar varies throughout its length to give substantially uniform fiber stress in service.

6. A railway joint bar comprising a web with head and base adapted to engage between those of the rail, said bar being of maximum cross-section and mass at the middle and its head and base diminishing gradually at either side thereof substantially to its end, in such wise that the effective strength of the bar varies throughout its length to give substantially uniform fiber stress in service.

7. A railway joint bar provided with bolt openings and having the metal displaced to provide such openings formed into fillets adjacent the openings on a side of the plate.

In testimony whereof, I have hereunto signed my name.

CHARLES D. YOUNG.